United States Patent [19]

Rathbone et al.

[11] Patent Number: 5,076,837
[45] Date of Patent: Dec. 31, 1991

[54] AIR SEPARATION IN COMBINATION WITH A CHEMICAL PROCESS

[75] Inventors: Thomas Rathbone, Farnham; John T. Lavin, Guilford, both of England

[73] Assignee: The BOC Group plc, Windlesham, England

[21] Appl. No.: 421,437

[22] Filed: Oct. 16, 1989

[30] Foreign Application Priority Data

Oct. 15, 1988 [GB] United Kingdom ............... 8824216

[51] Int. Cl.$^5$ .............................................. C21B 5/38
[52] U.S. Cl. .................................... 75/433; 75/958; 48/197 R; 60/648; 60/651; 60/671
[58] Field of Search ............... 60/39.02, 648, 651, 60/671; 62/11; 48/197 R; 266/160; 75/958, 433

[56] References Cited

U.S. PATENT DOCUMENTS 4,697,413 10/1987 Pohl .............................. 48/197 R
4,729,217 3/1988 Kehlhofer ........................ 60/39.02
4,861,369 8/1989 von Bogdandy et al. .......... 266/160

FOREIGN PATENT DOCUMENTS 83506 7/1981 Japan ................................. 60/648

Primary Examiner—Melvyn J. Andrews
Attorney, Agent, or Firm—Robert I. Pearlman; Coleman R. Reap

[57] ABSTRACT

A method and apparatus for recovering work from a nitrogen stream, wherein the nitrogen is preheated via heat exchange with hot fluid from a chemical process, which process utilizes the oxygen product of the air separation. Preferably at least a part of the expanded nitrogen is utilized to preheat at least one fluid reactant of the chemical process. The chemical process may be gasification or direct reduction of iron oxide, as well as the conversion of natural gas into synthesis gas.

10 Claims, 4 Drawing Sheets

AIR SEPARATION IN COMBINATION WITH A CHEMICAL PROCESS

TECHNICAL FIELD

This invention relates to air separation, particularly for producing oxygen for use in a partial oxidation reaction.

BACKGROUND OF THE PRIOR ART

Partial oxidation reactions, for example those required to produce a synthetic gas from natural gas, typically employ oxygen produced in a cryogenic plant for separating air by rectification and produce, for example, hundreds of tonnes of oxygen per day. Typically, the oxygen may contain up to 10% of impurities (mainly nitrogen). The air separation plant also produces nitrogen.

It is known to be advantageous to recover work from the nitrogen produced in the air separation plant. U.S. Pat. Nos. 2,520,862 and 3,731,495 disclose methods in which work is recovered from the nitrogen product, typically after compression, in a gas turbine. The nitrogen is employed to control the pressure in a combustion chamber associated with the gas turbine and thereby also reduce the rate of formation of oxides of nitrogen in the combustion chamber. The turbine may be employed to drive an alternator, and in this way electricity can be supplied to the air compressor employed in the air separation plant. Accordingly, most if not all of the energy requirements of the air separation process can be met. In UK Patent Specification 1 455 960 there is described an improved process for recovering work from the nitrogen product. This method involves a thermodynamic linking of the air separation plant with a steam generator. The nitrogen product is heat exchanged with flue gases intended for generation of steam in the steam generator so as to impart high grade heat to the nitrogen product and thus heat it to a temperature greater than 600° C. The nitrogen product is then work expanded to convert most of its required heat energy into mechanical energy. Steam is generated by the flue gases downstream of their heat exchange with the nitrogen product. Residual, available heat in the work-expanded nitrogen product is used to preheat fluids entering the steam generator.

The process described in UK patent specification 1 455 960 has a number of drawbacks. First, the use of high grade heat to raise steam is relatively inefficient. Second, there is a significant additional capital cost involved in steam raising. Third, although there is the potential to use work recovered from the air separation process to generate large excess quantities of electricity for export, the process according to UK 1 455 960 does not avail itself of this possibility. Fourth, a suitable steam generation plant may frequently not be available on the site of the air separation plant.

SUMMARY OF THE INVENTION

The present invention relates to a method of recovering work from a nitrogen stream, in which the nitrogen is preheated by heat exchange with hot fluid from a chemical process in which the oxygen product of the air separation partakes. Accordingly, the use of high grade heat to generate steam is avoided. According to the present invention there is provided a combined process in which air is separated into oxygen and nitrogen, a stream of the oxygen is supplied to a chemical process that takes place at elevated temperature and which produces as product or waste a hot gaseous stream., a stream of the nitrogen at a pressure of at least 5 (and preferably at least 10) atmospheres is heated to a temperature of at least 700° C. (and preferably at least 1000° C.) by heat exchange with the hot gaseous stream, and the thus heated nitrogen stream is expanded in a turbine with the performance of external work.

The invention also provides apparatus for performing the above method, comprising apparatus for separating air into oxygen and nitrogen; one or more chemical reactors for performing a chemical process in which the oxygen partakes, the reactor or reactors producing in use a hot gaseous stream., a heat exchanger for heat exchanging the hot gaseous stream with a stream of the nitrogen at a pressure of at least 5 atmospheres., and an expansion turbine for expanding the thus heated nitrogen with the performance of external work.

Preferably at least a part of the expanded nitrogen is used to pre-heat at least one fluid reactant that partakes in the chemical process.

The nitrogen may be raised to the desired pressure by means of a compressor. Typically, the air is separated in a double column of the conventional kind widely used in air separation. If such a double column is used, the lower pressure may advantageously be operated at a pressure of from 3 to 4 atmospheres absolute. In comparison with conventional operation of such column at a pressure between 1 and 2 atmospheres absolute. By this means less compression of the nitrogen is required.

The external work performed in the method according to the invention may be the compression of an air stream entering or product stream leaving the air separation process but is preferably the generation of electricity for another process than the air separation or for export.

The chemical process may be a gasification process or a process for the manufacture of steel by the direct reduction of iron oxide. The invention is however particularly suited for use in conducting partial oxidation reactions, particularly the conversion of natural gas into synthesis gas. In such a reaction, although it is desirable for the natural gas to be pre-heated before entering the reactor in which the partial oxidation takes place, the presence of higher hydrocarbons in the natural gas limits the temperature to which the natural gas can be in practice pre-heated owing to the tendency of these higher hydrocarbons to deposit carbon at temperatures in excess of 400° C. In accordance with a further preferred feature of the present invention, the natural gas is preferably purified to yield a pure methane product and this pure methane product is pre-heated to a temperature of at least 600° C. prior to its entry into the reactor where the partial oxidation reaction takes place. The higher hydrocarbons separated from the methane in the purification of the natural gas may themselves be supplied to the reactor in which the partial oxidation takes place but either without being preheated or else being preheated only to an appropriate lower temperature.

BRIEF DESCRIPTION OF THE DRAWINGS

The process and apparatus according to the invention are now to be described by way of example with reference to the accompanying drawings, in which.

DETAILED DESCRIPTION OF THE INVENTION

Figure 1:
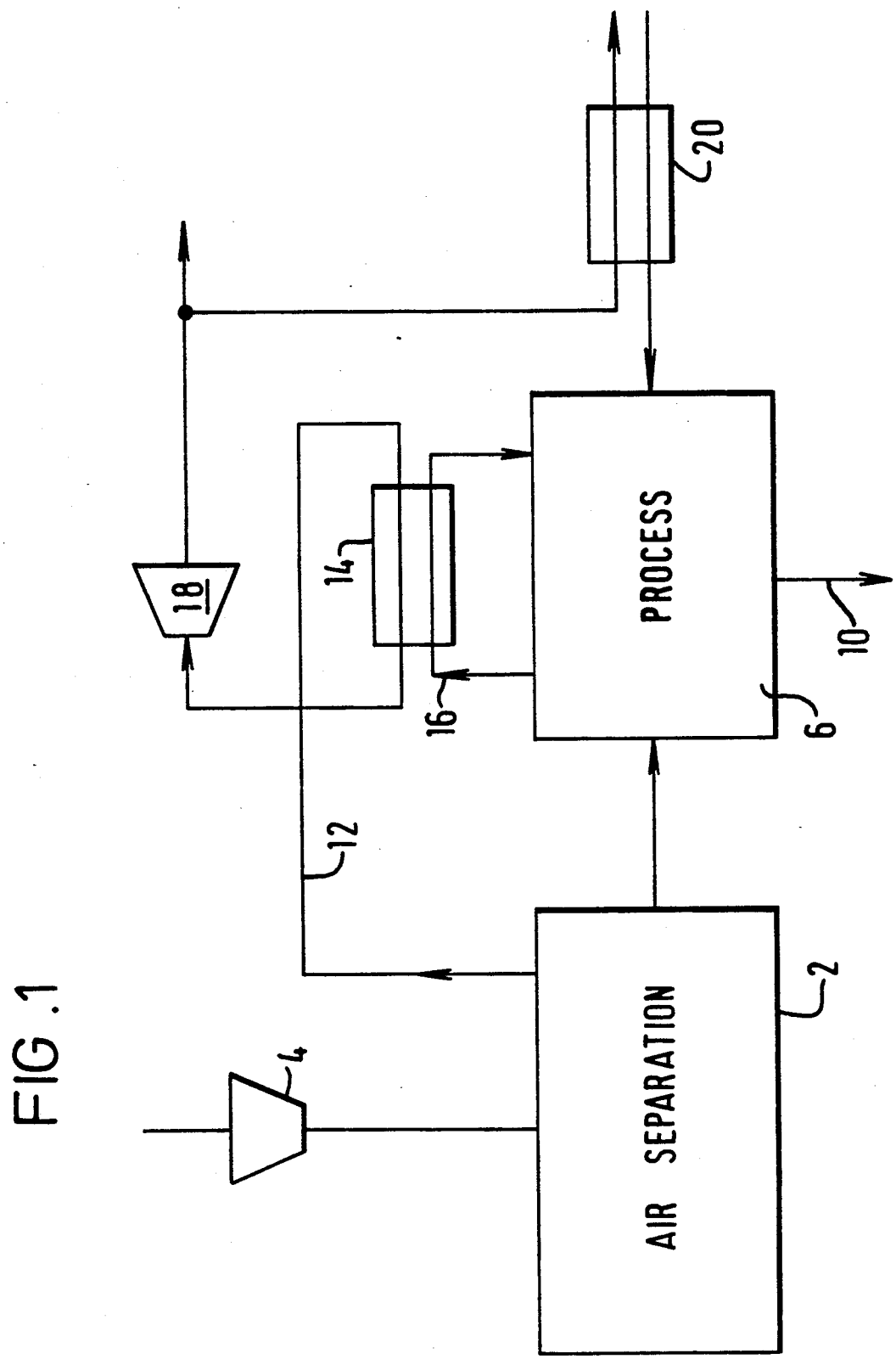
FIGS. 1, 3 and 4 are each a generalised schematic diagram illustrating the invention.

Referring to FIG. 1 of the drawing there is shown an air separation apparatus 2 including an air compressor 4. The air separation apparatus is able to separate air into oxygen and nitrogen products by methods well known in the art. The oxygen is supplied to plant 6 which employs it in a chemical reaction with one or more other fluid reactants to form a fluid product which is withdrawn from the plant 6 through a pipeline 10. The nitrogen is produced at a pressure of at least 5 atmospheres and flows through a conduit 12 which extends through a heat exchanger 14. The nitrogen is heated in the heat exchanger 14 to at least 700° C. The heat is provided by taking a hot fluid stream from the plant 6 and passing it through a conduit 16 which also passes through the heat exchanger 14 such that the hot fluid stream flows countercurrently to the nitrogen. The fluid stream is thereby cooled and is typically returned to the plant 6.

The nitrogen stream leaving the heat exchanger 14 at a temperature of at least 700° C. then enters a turbine 18 in which it is expanded with the performance of external work (typically the generation of electricity). At least part of the nitrogen stream leaving the turbine 18 is then used to preheat one or more of the fluid reactants supplied to the plant 6. The preheating is effected in the heat exchanger 20.

The plant 6 may be used to perform any of a wide range of processes, for example gasification of a carbonaceous fuel, the direct reduction of iron oxide, a partial oxidation, for example the formation of synthesis gas from a hydrocarbon such as natural gas. All these processes evolve the generation of heat with the consequence that hot fluid stream for heat exchange with the nitrogen can readily be provided. There is thus high grade heat available for the heating of the nitrogen stream from which work is recovered in the turbine 18, and the heat exchange with the nitrogen is a use of this heat more thermodynamically efficient than steam raising.

Figure 3:
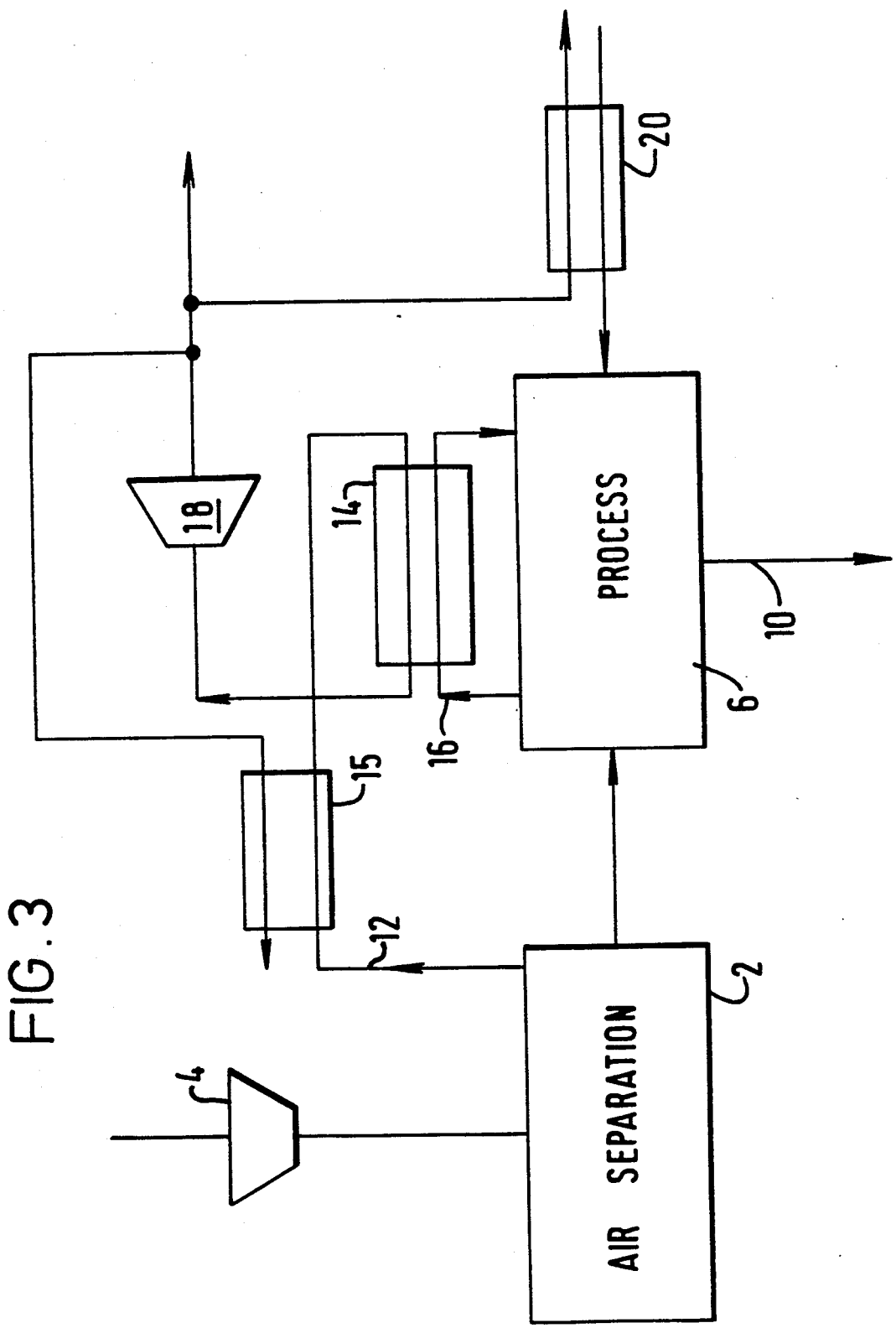

In FIG. 3 there is shown a modification to the plant illustrated in FIG. 1. Like parts in the two plants are indicated by the same reference numerals. The plant shown in FIG. 3 and its operation are generally the same as the plant shown in FIG. 1 save that an additional part of the nitrogen stream leaving the expansion turbine 18 is used to preheat the nitrogen stream flowing through the conduit 12 at a region upstream of its entry into the heat exchanger 14. This preheating is effected by countercurrent heat exchange in a heat exchanger 15.

Figure 2:
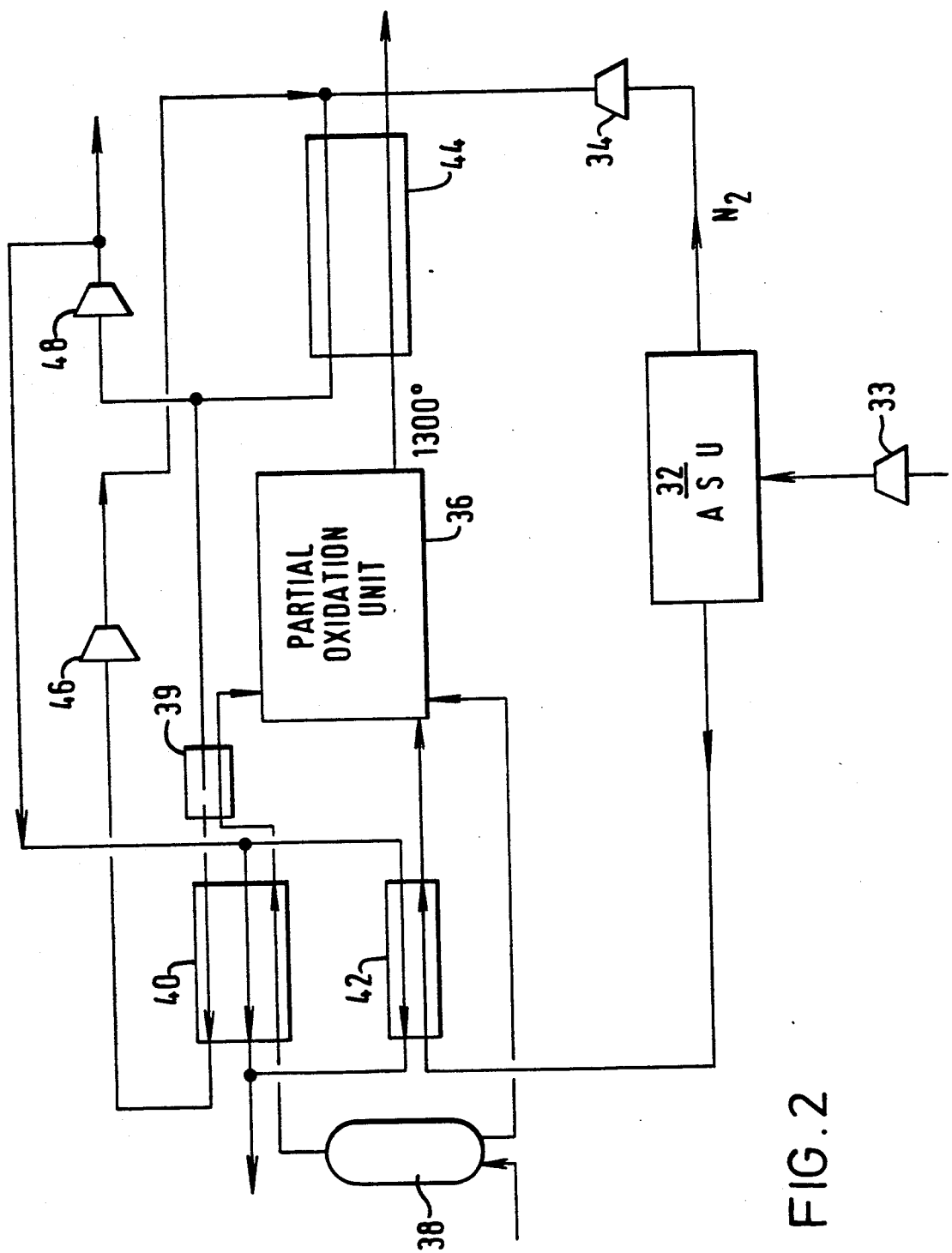
FIG. 2 is a schematic drawing

Referring now to FIG. 2, air is passed to an air separation apparatus 32 in which it is separated into oxygen and nitrogen products The oxygen product preferably contains only a minimum of impurities to render it suitable for use in a partial oxidation process for converting natural gas to methane. The oxygen may for example include 0.5% by volume of impurities (generally argon and nitrogen). The air separation apparatus 32 may be as described in any of the prior specifications discussed in the introductory paragraphs hereof. It may for example be of a conventional double column kind as described in Ruhemann's "Separation of Gases", Oxford University Press, 1945. Typically, the partial oxidation process may require the oxygen to be supplied at a pressure higher than that of the rectification column (not shown) from which it is taken. The air separation apparatus 32 may therefore include an oxygen compressor (not shown) or the oxygen may be produced at the desired pressure by liquid oxygen pumping. The air separation apparatus 32 also provides a nitrogen product. If the product is produced at a pressure of under 10 atmospheres, a compressor 34 is preferably employed to raise the pressure to at least 5 and preferably at least 10 atmospheres according to the desired inlet pressure for an expansion turbine 48 to which it is supplied. The compressor 34 has no water cooler associated therewith so that the nitrogen typically leaves the compressor at a temperature in the order of 150° C.

Both the oxygen and nitrogen streams are used in connection with a partial oxidation reaction as shall be described below. In the partial oxidation, natural gas is partially oxidised with oxygen to form a synthesis gas having a chosen carbon monoxide content. The reactor in which the partial oxidation reaction takes place is indicated by the reference 36. The reactor 36 may be used to perform any known partial oxidation process in which the reactants are natural gas and relatively pure oxygen. (An example of such a process is the Texaco process described in Petroleum Processing Handbook, Bland, H. F., Davidson, R. L., McGraw-Hill 1967, Chapter 3 pp 144–145.) The natural gas which is reacted in the partial oxidation reactor 36 is first purified in a natural gas purification apparatus 38. The apparatus 38 may comprise any known apparatus for purifying natural gas for example by means of cryogenic refrigeration and separation. An example of a suitable apparatus is described in Oil & Gas Journal, July 1977, p 60.

A pure methane stream from the purification apparatus 38 is then passed through heat exchangers 40 and 39 in sequence to raise its temperature from about ambient temperature to a temperature of 600° C. up to 1100° C. In choosing the temperature to which the methane is preheated, care should be taken to select a temperature not so high that the methane cracks thermally in the heat exchanger 40 or 39. The methane is then introduced into the partial oxidation reactor 36. It is reacted in the reactor 36 with a stream of oxygen supplied from the air separation apparatus 32. The oxygen is preheated in a heat exchanger 12 to a temperature not in excess of 200° C. (higher temperatures are deemed to be unsafe). The oxygen is then introduced into the partial oxidation reactor 36 where it reacts with the methane and with higher hydrocarbons which are supplied to the reactor 36 directly through the natural gas purification apparatus 38 without being preheated. Hot synthesis gas with a temperature of 1300° C. leaves the partial oxidation reactor 36. The synthetic gas is used to preheat the compressed nitrogen from the compressor 34, or if no such compressor is employed, directly from the air separation apparatus 32. Pre-heating takes place in a heat exchanger 44. The synthesis gas leaves the heat exchanger 44 at a temperature of about 400° C., is then scrubbed (by means not shown) to remove soot particles, and is then reacted to produce one or more fluid chemical compounds that include hydrogen, for example gasoline, kerosene, ammonia or urea. The nitrogen leaves the heat exchanger 44 at a temperature in the order of 1250° C. The nitrogen is then divided into major and minor streams. The minor stream comprising about 20% of the nitrogen is employed to provide the heating of the heat exchanger 39 and part of the heating for the heat exchanger 40 in which the methane is preheated prior to its introduction into the partial oxidation reactor 36. Accordingly, the minor stream is passed through the heat exchangers 39 and 40 countercurrently to the methane flow by means of a blower 46 and is then returned to the nitrogen stream upstream of its introduction into the heat exchanger 44. The major part of the nitrogen stream leaving the heat exchanger 44 is expanded in the expansion turbine 48 with the performance of external work. Typically, the turbine 48 is used to drive an alternator (no shown) in a power station so as to generate electricity, but may alternatively be coupled to the air compressor as in a commercially available gas turbine. In this case some fuel may additionally be burned in the gas turbine in order to increase the power input. The electricity thus generated may exceed the power requirements of the air separation plant. The nitrogen leaves turbine 48 at a temperature of about 600° C. and a pressure of 1.1 atmospheres.

A part (typically 20%) of the nitrogen leaving the expansion turbine 48 is then used to heat the oxygen by passage through the heat exchanger 42 countercurrently to the flow of oxygen. Another part (typically 50%) is used to give additional heating to the methane in the heat exchanger 40 and is passed through the heat exchanger 40 countercurrently to the methane flow. After passage through the heat exchangers 40 and 42 respectively, the nitrogen streams taken from the outlet of the expansion turbine 48 may be vented to the atmosphere. That part of the expanded nitrogen (typically 30%) from the turbine 48 not used in the heat exchanger 40 or heat exchanger 42 may be used to raise steam if a steam generator (not shown) is available.

It will be appreciated that the pre-heating of the oxygen and methane entering the partial oxidation reactor 6 will not typically be sufficient to meet all the requirements for thermal energy of the partial oxidation process. However, a significant reduction in these requirements is made possible. In this way the process requirements of both oxygen and natural gas can be reduced, because the invention makes possible a lower level of essentially complete combustion of the natural gas in order to maintain the exit temperature of the partial oxidation reactor 36.

The net savings in power made possible by the method according to the invention are illustrated by the following example:

nitrogen product stream is compressed to a pressure of 16 bar in a compressor 70. It is then heated to a temperature of 733° K. in a heat exchanger 72. The resulting compressed hot nitrogen stream is then further raised in temperature to 1373° K. by passage through the heat exchanger 68. At this temperature, the resulting hot nitrogen stream enters an expansion turbine 74 and is expanded therein It leaves the turbine 74 at a pressure of 1.05 bar and a temperature of 753° K. The expanded nitrogen stream then flows through the heat exchanger 72 countercurrently to the nitrogen flow therethrough from the compressor 70.

In one example of the method according to the invention, the compressor 60 has an outlet pressure of 5.8 bar, the oxygen compressor 64 an inlet pressure of 1.3 bar and an outlet pressure of 40 bar, and the nitrogen compressor 70 an inlet pressure of 1 bar and an outlet pressure of 10.8 bar. In this example, the turbine 74 has an inlet pressure of 10 bar and an outlet pressure of 1.05 bar.

In a second example of the method according to the invention, the compressor 60 has an outlet pressure of 10 bar, the oxygen compressor 64 an inlet pressure of 3 bar and an outlet pressure of 40 bar, and the nitrogen compressor 70 an inlet pressure of 2.7 bar and an outlet pressure of 10.8 bar. In this example, the turbine 74 has an inlet pressure of 10 bar and an outlet pressure of 1.05 bar.

The net power consumption in both examples can now be calculated, assuming:

a) an oxygen demand of 2000 tonnes per day at 95% purity
b) all compression work is performed at 70% isothermal efficiency
c) the isentropic efficiency of the hot nitrogen turbine is 89%

This net power consumption can be compared with that in a third example in which no work is recovered from the nitrogen stream, and hence no nitrogen compression or expansion is performed, but otherwise the operating parameters are as in the first example, and with that in a fourth example which is generally similar to the third example but in which 51MW of heat is recovered from the plant 66 and is converted to electrical power by a steam raising cycle operating at 39% efficiency. The comparison is shown in the Table below.

|  | Example 1 MW | Example 2 MW | Example 3 MW | Example 4 MW |
| --- | --- | --- | --- | --- |
| Air Compression | 21.2 | 28.2 | 21.2 | 21.2 |
| Oxygen Compression | 9.6 | 6.7 | 9.6 | 9.6 |
| Nitrogen Compression | 23.0 | 13.4 | — | — |
| (Hot Nitrogen Expansion) | (49.0) | (49.0) | — | — |
| (Steam Expansion) | — | — | — | (20.0) |
| Net power requirement | 4.8 |  | 30.8 | 10.8 |
| Net power surplus |  | (0.7) |  |  |

Figure 4:
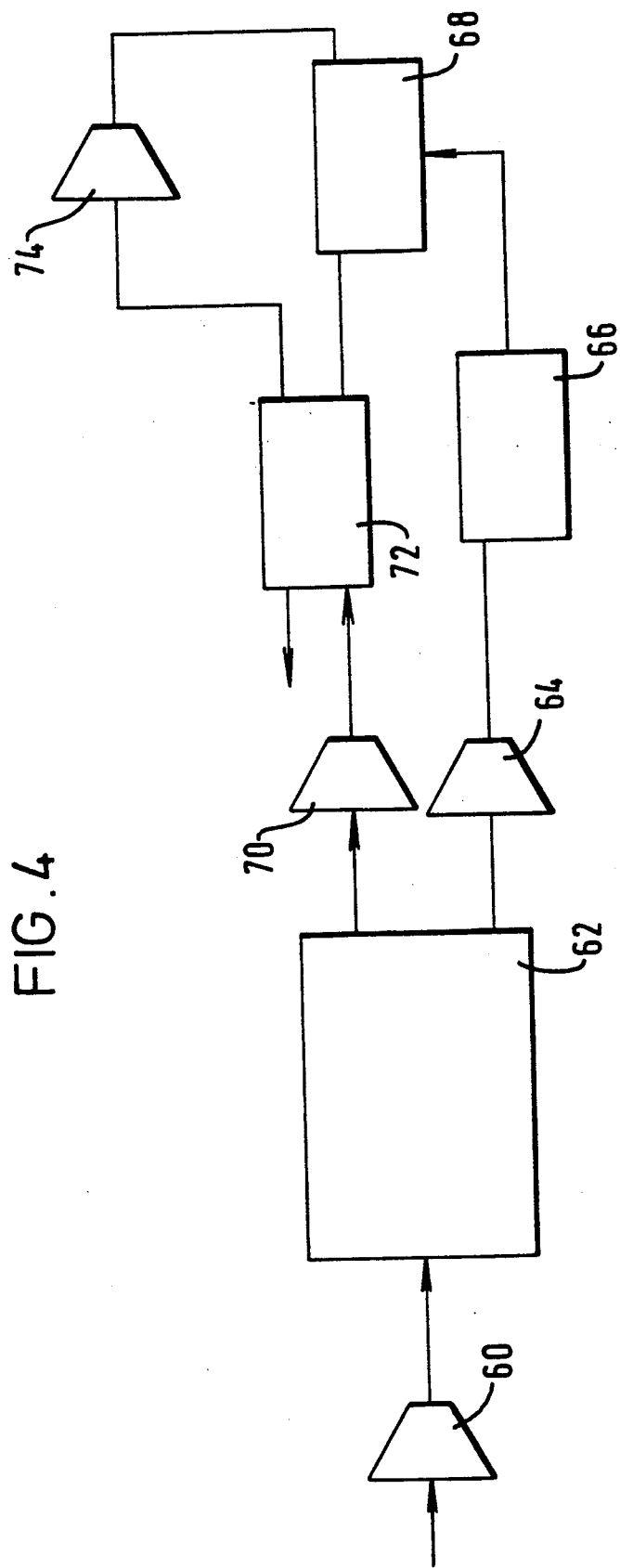

Referring to FIG. 4 of the drawings, a stream of air is compressed in a compressor 60. The compressed air stream is then separated in an air separation plant 62 utilising a double column (not shown). The plant 62 produces from the lower pressure column (not shown) a stream of oxygen product and a stream of nitrogen product. The oxygen product stream is compressed in a compressor 64 and passed to a plant 66 in which it is used, for example, in a partial oxidation reaction. The plant 66 produces one or more hot fluid streams which are used to provide heating for a heat exchanger 68. The It can be seen from the Table that the net power requirements in Examples 1 and 2 are significantly less than in Examples 3 and 4. Moreover, by operating the double column in Example 2 at pressures higher than are conventional, an overall net production of power can be achieved.

We claim:

1. A combined process comprising: separating air into oxygen and nitrogen; supplying a stream of the oxygen to a chemical process that takes place at elevated temperature and that produces as product or waste a hot gaseous stream; heating a stream of the nitrogen at a pressure of at least 5 atmospheres to a temperature of at least 700° C. by heat exchange with the hot gaseous stream; and expanding the thus heated nitrogen stream in a turbine with the performance of external work.

2. A process as claimed in claim 1, in which the stream of nitrogen is heated to a temperature of at least 1000° C. at a pressure of at least 10 atmospheres.

3. A process as claimed in claim 2, in which the external work is the generation of electricity.

4. A process as claimed in claim 2, in which at least a part of the expanded nitrogen is used to pre-heat at least one fluid reactant that partakes in the chemical process.

5. A process as claimed in claim 1, in which at least a part of the expanded nitrogen is used to heat the said stream of nitrogen that is at a pressure of at least 5 atmospheres.

6. A process as claimed in claim 2, in which the chemical process includes the gasification of a carbonaceous material or the direct reduction of iron oxide.

7. A process as claimed in claim 1, in which the chemical process is a partial oxidation of a hydrocarbon.

8. A process as claimed in claim 7, in which the chemical process is the partial oxidation of natural gas to produce synthesis gas.

9. A process as claimed in claim 8, further including the steps of purifying the natural gas to yield pure methane and preheating the methane by at least part of the expanded nitrogen to a temperature of at least 600° C. upstream of the partial oxidation reaction.

10. A process as claimed in claim 1, in which the stream of nitrogen is taken at a pressure in the range of about 3 to 4 atmospheres from the lower pressure column of a double distillation column for the separation of air and is then compressed to raise it to a pressure of at least 5 atmospheres.

* * * * *